United States Patent [19]
Morii et al.

[11] Patent Number: 5,426,992
[45] Date of Patent: Jun. 27, 1995

[54] NON-BACKLASH TOOTHED WHEEL MECHANISM AND ROTATIONAL PHASE ADJUSTER THEREWITH

[75] Inventors: Yasushi Morii, Nagoya; Michio Adachi, Obu, both of Japan

[73] Assignee: Nippondenso Co., Ltd., Kariya, Japan

[21] Appl. No.: 69,002

[22] Filed: May 28, 1993

[30] Foreign Application Priority Data

May 29, 1992 [JP] Japan .................. 4-139039
Mar. 18, 1993 [JP] Japan .................. 5-058494

[51] Int. Cl.⁶ .................. F16H 55/18; F16H 1/12; F16H 3/10
[52] U.S. Cl. .................. 74/409; 474/900; 464/160; 74/568 R
[58] Field of Search .................. 74/567, 568 R, 89.15, 74/409; 123/90.15, 90.17, 90.31; 474/900; 403/359; 464/160, 161, 169

[56] References Cited

U.S. PATENT DOCUMENTS

| | | | |
|---|---|---|---|
| 4,303,149 | 12/1981 | Lech, Jr. .................. | 403/359 X |
| 4,473,317 | 9/1984 | Bolang .................. | 403/359 |
| 4,811,698 | 3/1989 | Akasaka et al. .................. | 123/90.17 |
| 4,976,229 | 12/1990 | Charles .................. | 123/90.17 |
| 4,993,370 | 2/1991 | Hashiyama et al. .................. | 123/90.17 |
| 5,033,327 | 7/1991 | Lichti et al. .................. | 74/567 X |
| 5,119,691 | 6/1992 | Lichti et al. .................. | 74/567 X |
| 5,163,872 | 11/1992 | Niemiec et al. .................. | 123/90.17 X |
| 5,209,194 | 5/1993 | Adachi et al. .. | |
| 5,343,834 | 9/1994 | Rembold et al. .................. | 74/568 R X |

FOREIGN PATENT DOCUMENTS

| | | | |
|---|---|---|---|
| 429536 | 10/1964 | Japan . | |
| 61-279713 | 12/1986 | Japan . | |
| 0003111 | 1/1987 | Japan .................. | 123/90.17 |
| 62-3111 | 1/1987 | Japan . | |
| 62-3112 | 1/1987 | Japan . | |
| 0003112 | 1/1987 | Japan .................. | 123/90.17 |
| 404164107 | 6/1992 | Japan .................. | 123/90.17 |

*Primary Examiner*—John E. Ryznic
*Attorney, Agent, or Firm*—Cushman, Darby & Cushman

[57] ABSTRACT

A non-backlash toothed wheel mechanism comprises, an internal gear, and an external gear mating with the internal gear wherein at least one of the internal gear and the external gear has a circumferentially arranged gear teeth array and at least two gear parts each of which has gear teeth forming a part of the circumferentially arranged gear teeth array, a positional relation between the gear parts is changeable, and the mechanism further comprises elastic means for urging one of the two gear parts relatively to another one of the two gear parts to change the positional relation between the gear parts so that each of the gear parts mates with another one of the internal gear and the external gear to reduce a backlash between the one of the internal gear and the external gear and the another one thereof.

16 Claims, 9 Drawing Sheets

FIG. 1

← AXIAL DIRECTION →

NON-BACKLASH TOOTHED WHEEL MECHANISM AND ROTATIONAL PHASE ADJUSTER THEREWITH

BACKGROUND OF THE INVENTION AND RELATED ART STATEMENT

The present invention relates to a toothed wheel mechanism and a rotational phase adjuster therewith.

A prior-art rotational phase adjuster for changing a rotational phase difference between a camshaft and a crank shaft in an internal combustion engine is disclosed by each of Publications of Japanese Unexamined Patent Application No. 61-279713, Japanese Unexamined Patent Application No. 62-3111 and Japanese Unexamined Patent Application No. 62-3112.

In the prior-art rotational phase adjuster, a first wheel has an outer-side internal helical gear, a second wheel has an outer-side external helical gear mating with the outer-side internal helical gear and an inner-side internal helical gear, and a third wheel has an inner-side external helical gear mating with the inner-side internal helical gear. The second wheel is moved in an axial direction of the gears relatively to the first wheel and the third wheel to generate a rotationally differential movement between the first wheel and the third wheel. The second wheel is divided into two parts by a plane extending perpendicularly to the axial direction of the gears, and an elastic member between the two parts urges one of the two parts to go away from another one of the two parts in the axial direction of the gears, so that backlashes between the outer-side external helical gear and the outer-side internal helical gear and between the inner-side external helical gear and the inner-side internal helical gear are reduced.

OBJECT AND SUMMARY OF THE INVENTION

An object of the present invention is to provide a non-backlash toothed wheel mechanism and a rotational phase adjuster therewith, in which an axial length thereof is small.

According to the present invention, a non-backlash toothed wheel mechanism comprises,
an internal gear, and
an external gear mating with the internal gear, wherein
at least one of the internal gear and the external gear has at least two gear parts into which the one of the internal gear and the external gear is divided in a circumferential direction of the mechanism, a positional relation between the gear parts is changeable while a pitch circle of each of the two gear parts is kept substantially constant, and the mechanism further comprises elastic means for urging the one of the two gear parts to change the positional relation between the gear parts so that each of the gear parts mates with another one of the internal gear and the external gear.

In the present invention, since the one of the internal gear and the external gear is divided in the circumferential direction of the mechanism and the positional relation between the gear parts is changed by the elastic means to reduce the backlash with keeping the pitch circle of each of the two gear parts substantially constant, a space does not need to extend in a direction perpendicular the axial direction of the mechanism and a mating condition between the gear parts and the another one of the internal gear and the external gear is not deteriorated while the backlash is reduced. Therefore, the non-backlash toothed wheel mechanism and rotational phase adjuster therewith in which the axial length thereof is small can be provided.

DETAILED DESCRIPTION OF THE PREFERRED EMBODIMENTS

Figure 1:
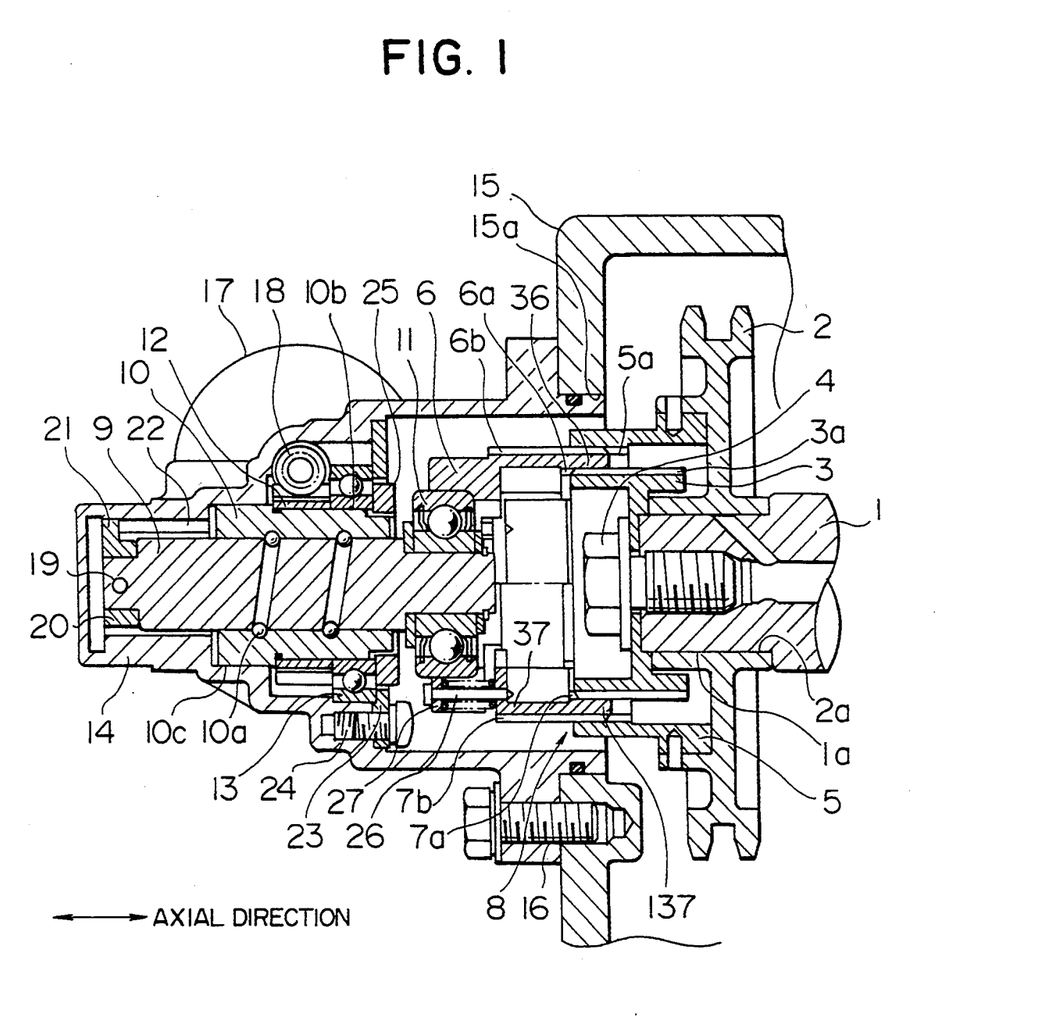
FIG. 1 is a vertical sectional view for illustrating the general construction of the whole valve timing control apparatus according to a first embodiment of the present invention.

In FIG. 1, reference numeral 1 denotes a cam shaft which drives to open and close intake and exhaust valves of an internal combustion engine, which are not shown, and reference numeral 2 denotes a sprocket (rotation transmission member) which is driven rotatively through a crankshaft and a timing chain which are not shown.

The sprocket 2 is formed in the center thereof with a bore 2a in which a stepped portion 1a of the cam shaft 1 is fitted so that they are allowed to rotate relatively. Axial movement of the sprocket 2 is prevented by the stepped portion 1a, a cam shaft sleeve 3 (central gear) and a bolt 4. The cam shaft sleeve 3 is so fixed as to rotate together with the cam shaft 1 through the medium of, for example, an axially inserted pin which is not shown.

A cylindrical sprocket sleeve 5 (outermost internal gear) is integrally fixed to the sprocket 2 so as to be coaxial with the cam shaft 1. The cam shaft sleeve 3 is formed on the outer peripheral surface thereof with external gear helical splines 3a, while the sprocket sleeve 5 is formed on the inner peripheral surface thereof with internal gear helical splines 5a. The internal gear helical splines 5a have a helix angle the direction of which is reverse to or different from that of the external gear helical splines 3a. In some cases, however, one of them may be such splines that have axial straight teeth the helix angle of which is 0 (zero) in place of the helical splines.

Between the cam shaft sleeve 3 and the sprocket sleeve 5 is formed a substantially cylindrical space in which a cylindrical gear assembly 8 comprising a controlling member 6 and arcuate gears 37 and 47 assembled within a space formed by partially cutting off the circumferential wall of the controlling member 6 in the axial direction thereof is inserted so as to be able to move back and forth in the axial direction. The controlling member 6 and the arcuate gears 37 and 47 are formed on the inner cylindrical surfaces of the gear portions thereof with internal gear helical splines 6a and 7a, respectively. The internal gear helical splines 6a and 7a are engaged with the external gear helical splines 3a of the cam shaft sleeve 3, while the external gear helical splines 6b and 7b formed on the outer cylindrical surfaces of the gear portions of the controlling member 6 and the arcuate gears 37 and 47 are engaged with the internal gear helical splines 5a of the sprocket sleeve 5.

The cylindrical gear assembly 8 comprising the controlling member 6 and the arcuate gears 37 and 47 is engaged with the internal and external helical splines 3a and 5a of the cam shaft sleeve 3 and the sprocket sleeve 5, unless its axial position is changed, so that the sprocket 2 and the cam shaft 1 are rotated together so as to transmit rotation of the sprocket 2 to the cam shaft 1. However, by making the cylindrical gear assembly 8 slide in the direction of the axis of the cam shaft 1 during the rotation, the position where the helical splines of the cam shaft sleeve 3 and the sprocket sleeve 5 are engaged with the helical splines of the cylindrical gear assembly 8 is shifted, so that it is possible to make the sprocket 2 and the cam shaft 1 relatively rotate in opposite directions along the tooth traces of the helical splines 3a and 5a.

Therefore, by controlling the axial position of the cylindrical gear assembly 8m it is possible to freely adjust the phase of the cam shaft 1 with respect to the sprocket 2, and hence, to the crankshaft of the internal combustion engine during the operation. Since the structure of the cylindrical gear assembly 8 constitutes a characteristic feature of the present invention, it will be described later in detail.

As a phase control mechanism which serves to move the cylindrical gear assembly 8 in the direction of the axis of the cam shaft 1 for adjustment as well as to support the same for free rotation, a ball screw mechanism having a shaft portion 9 and a nut portion 10 and a ball bearing 11 supported on a portion of the shaft portion 9 are used. In the shaft portion 9 and the nut portion 10, screw slots formed in the outer periphery of the shaft portion 9 and the inner periphery of the nut portion 10 are engaged with each other through a large number of balls 10a rolling along the screw slots and, although not illustrated, a well-known circulation mechanism is equipped for circulating the balls 10a when the shaft portion 9 and the nut portion 10 are made to rotate each other. By so doing, the ball screw mechanism can reduce friction as compared with the current screw, and therefore, it is possible to make the shaft portion 9 and the nut portion 10 easily rotate relatively even by virtue of a small turning force.

The nut portion 10 of the ball screw mechanism is supported within a housing 14 of the control apparatus by means of a worm wheel 12 attached to the nut portion 10 and a ball bearing 13 so as to be rotatable but prevented from moving in the axial direction. The housing 14 is fastened to a cylinder head 15 of the internal combustion engine by means of a bolt 16 of the like so as to close an opening portion 15a having its center located substantially on the cam shaft 1. The worm wheel 12 meshes with a warm 18 which is driven by an electric motor 17 to rotate clockwise and counterclockwise, and the rotation of the worm wheel is controlled by a control unit which is not shown.

The shaft portion 9 of the ball screw mechanism is supported by the nut portion 10 through the balls 10a. However, as the nut portion 10 is driven by the electric motor 17 to rotate through the worm 18 and the worm wheel 12, the shaft portion 9 itself is moved right and left with respect to the axial direction by an amount corresponding to the angle of rotation of the nut portion 10 in accordance with the direction of rotation of the nut portion 10, since the rotary motion of the shaft portion 9 is restrained by the engagement between a radial projection of a coupling 20 attached to the end of the shaft portion 9 by means of a pin 19 and an axial groove 22 formed in the inner surface of the projecting portion of the housing 14 for serving to guide the projection 21 in the axial direction. By so doing, the cylindrical gear assembly 8 which is attached to the inner forward end of the nut portion 10 through the ball bearing 11 is positioned in the axial direction.

Incidentally, in the structure of the embodiment shown in FIG. 1, a right end portion 10b of the nut portion 10 is supported rotatably by the ball bearing 13 as described above, while a left end portion 10c thereof is rotatably supported by the cylindrical inner wall formed in the housing 14. Reference numeral 23 denotes a fixing member which serves to fix the outer ring of the ball bearing 13 to the housing 14 by means of a bolt 24 so as to prevent the axial movement of the nut portion 10. Further, reference numeral 25 denotes a ring-shaped nut which is engaged by screwing with the external thread portion at the right end portion of the nut portion 10 so as to fix the inner ring of the ball bearing 13 to the nut portion 10.

Figure 2:
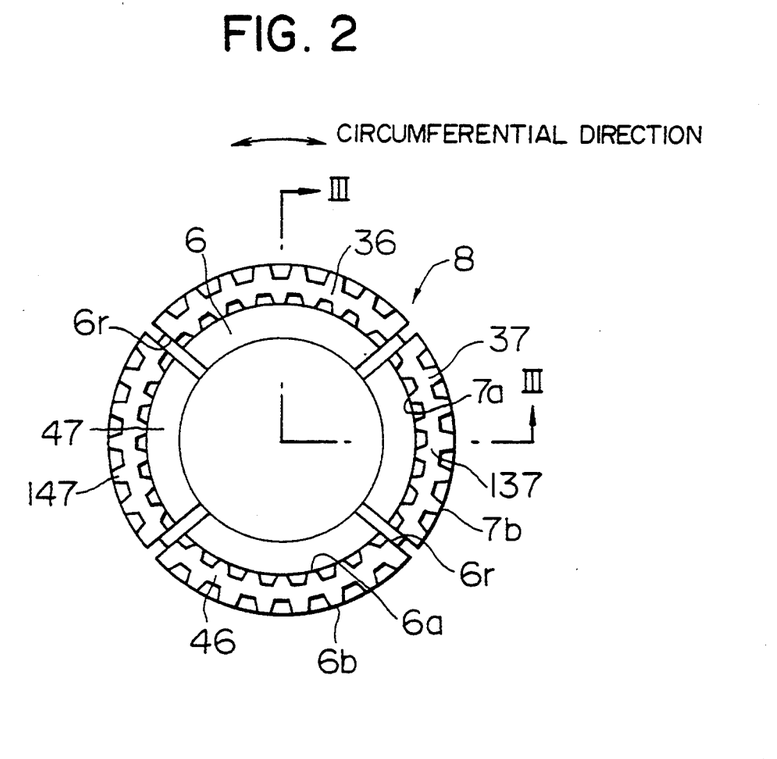
FIG. 2 is a plan view for illustrating essential portions of the embodiment shown in FIG. 1.
Figure 3:
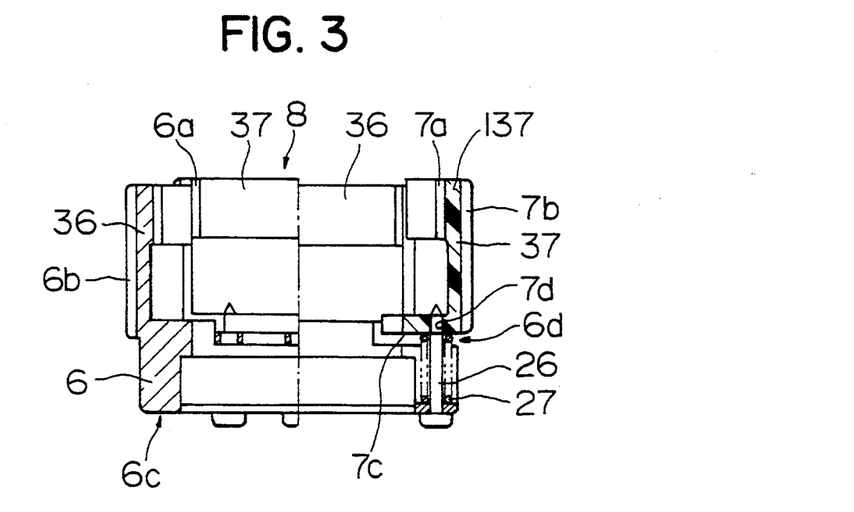
FIG. 3 is a vertical sectional view taken along the line III—III of FIG. 2.

Next, description will be given of the detailed structure of the cylindrical gear assembly 8 which constitutes the characteristic feature of the present invention and comprises the controlling member 6, arcuate gears 37 and 47 and the like, with reference to not only FIG. 1 but also FIGS. 2 to 4.

In the illustrated embodiment, the gear portion of the cylindrical gear assembly 8 has such a configuration that looks as if a cylindrical gear used in the prior art were cut and divided into four arcuate portions in the circumferential direction with a cutter movable in the axial direction. A pair of opposed gear portions 36 and 46 are the portions extending from the controlling member 6 in the axial direction, and are formed on the radially inner and outer surfaces thereof with the internal gear helical splines 6a and the external gear helical splines 6b, respectively, as described before. On the other hand, another pair of opposed gear portions 137 and 147 the positions of which are shifted through 90° from those of the pair of gear portions 36 and 46, constitute the axially extended portions of the aforesaid two arcuate gears 37 and 47 and are formed on the radially inner and outer surfaces thereof with the internal gear helical splines 7a and the external gear helical splines 7b, respectively, as described before.

Figure 4:
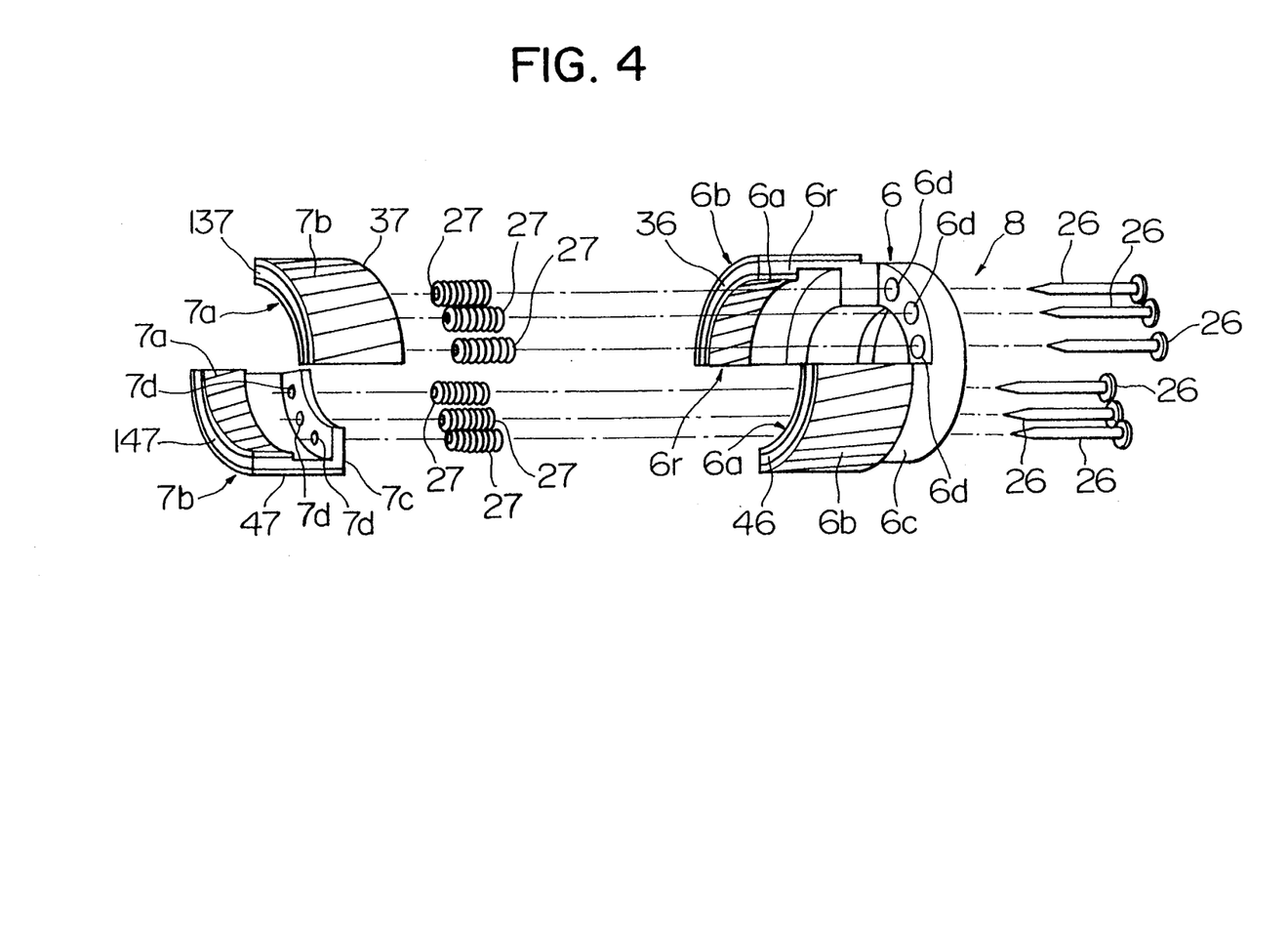
FIG. 4 is a disassembled perspective view for illustrating the essential portions of the first embodiment shown in FIGS. 2 and 3.

As is obvious from the above description and FIG. 4, the controlling member 6 has such a configuration that is formed by partially cutting off the circumferential wall of the cylindrical gear portion in the axial direction. The gear portions 36 and 46 are constituted by the portions remaining after the cutting work and the separate arcuate gears 37 and 47 are inserted in two spaces 6r formed by the cutting work, respectively, so as to fill up them. The gear portions 137 and 147 of the arcuate gears 37 and 47 are so set as to be able to align with the gear portions 36 and 46 of the controlling member 6, thereby constituting the cylindrical gear assembly 8 as a whole. As shown in FIG. 3, either gear portions 36 and 46 or arcuate gears 37 and 47 may be made of plastic.

A plurality of axial holes 6d are formed in the end portion 6c of the controlling member 6 so as to agree with the end faces of the arcuate gears 37 and 47, and an axial pin 26 in loosely fitted in each of the holes 6d. Forward ends of the pins 26 are pressed and fixed in axial small holes 7d formed in base portions 7c of the arcuate gears 37 and 47 such that the gears 37 and 47 are supported by a top contact portion and a bottom contact portion of the pins 26. The arcuate gears 37 and 47 are restrained by the controlling member 6 so as to be permitted to move in the axial direction with respect to the controlling member 6 as well as to be moved together in the direction of rotation. The diameter of the axial holes 6d formed in the end faces 6c of the controlling member 6 is increased on the side facing on the arcuate gears 37 and 47, and a coiled spring 27 is received for the most part in the increased-diameter portion of each hole 6d with one end thereof supported by the stepped portion formed between the increased-diameter portion and the small-diameter portion. The other end of each coiled spring 27 is brought into contact with the base portion 7c of the arcuate gear 37 or 47 so that the arcuate gears 37 and 47 are pressed in the axial direction, with the result that the arcuate gears 37 and 47 are biased so as to make the tooth traces of the internal gear helical splines 7a and the external gear helical splines 7b of the gear portions 137 and 147 of the arcuate gears 37 and 47 offset from the tooth traces of the internal gear helical splines 6a and the external gear helical splines 6b of the gear portions 36 and 46 of the controlling member 6.

Next, description will be given of the system structure of an automobile engine to which the first embodiment of the present invention is applied, with reference to FIG. 5.

Figure 5:
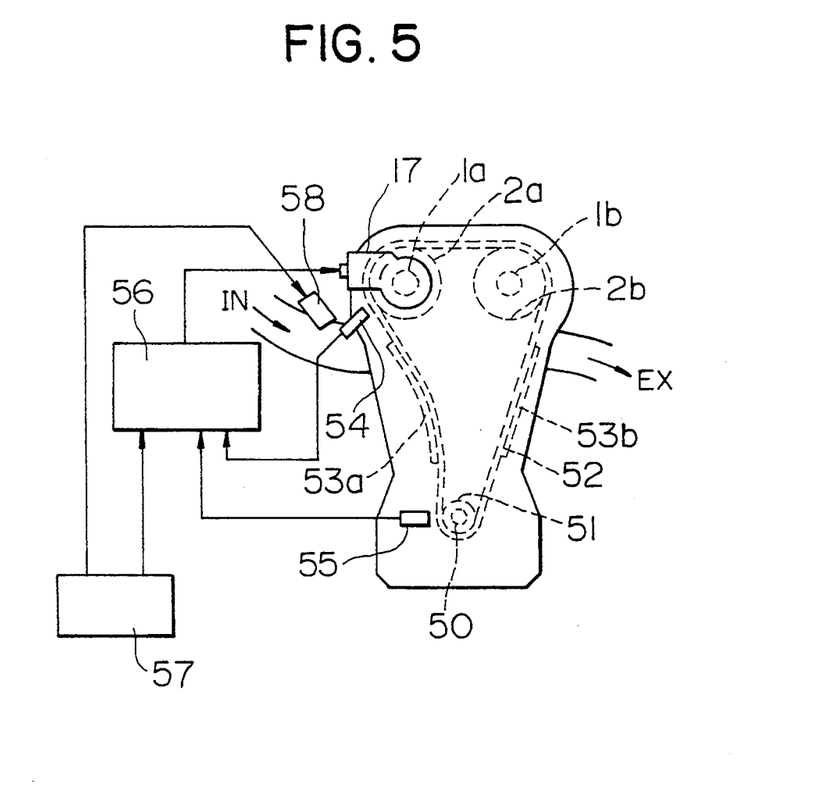
FIG. 5 is a block diagram for illustrating the control system of the first embodiment of the present invention.

FIG. 5 is a structural view for illustrating the system structure of the automobile engine in which the valve timing control apparatus of the first embodiment is employed.

Referring to FIG. 5, in this embodiment, an intake cam shaft 1a of a DOHC engine is equipped with the valve timing control apparatus. An intake sprocket 2a and an exhaust sprocket 2b are driven rotatively by a cranksprocket 51 provided on a crankshaft 50 of the engine through a timing chain 52, so that the intake cam shaft 1a and an exhaust cam shaft 1b are driven. Incidentally, reference numerals 53a and 53b denote guides.

The motor 17 the rotational position of which is controlled by the valve timing control unit 56 is controlled by the feedback system so as to make it possible to obtain a desired valve timing. In this embodiment, a cam shaft rotation sensor 54 which is synchronized with the rotation of the cam shaft 1a and produces a signal at every prescribed rotational angle and a crankshaft rotation sensor 55 which is synchronized with the rotation of the crankshaft 50 and produces a signal at every prescribed rotational angle are equipped, and the signals from the both sensors 54 and 55 are fed to the control unit 56. The control unit 56 computes a phase difference between the signals from the both sensors 54 and 55 and makes the feed back control on the motor 17 so as to bring the detected phase difference closer to a desired phase difference. Incidentally, the desired phase difference is set in such a manner that the most suitable valve timing can be obtained in response to the engine load represented by both an intake air amount signal Q and an engine rotational frequency signal Ne which are sent from a fuel injection control unit 57 serving to control a fuel injection valve 58 and the like.

Next, description will be given of the operation of the first embodiment shown in FIGS. 1 to 5.

During the running of the engine, in case that the operation of changing the valve timing is not performed, the cylindrical gear assembly 8 is rotated on the ball bearing 11 together with the sprocket sleeve 5 and the cam shaft sleeve 3 without changing its axial position, and therefore, the sprocket 2a and the cam shaft 1a are rotated together through the cylindrical gear assembly 8 serving as the transmission unit. For this reason, there is no possibility that the valve timing is changed.

In case that it becomes necessary to change the valve timing in accordance with the running condition, the control unit 56 operates to change the control signal so that the worm 18 is driven by the motor 17 to rotate clockwise or counterclockwise through the specified rotational angle. Rotation of the motor 17 is slowed down by means of the worm 18 and the worm wheel 12, and the worm wheel 12 is rotated together with the nut portion 10 of the ball screw mechanism with respect to the shaft portion 9 and the housing 14. Since the nut portion 10 is prevented from moving in the axial direction as described before and, further, since the shaft portion 9 is prevented from rotating by the coupling 20 engaged with the axial groove 22, as the nut portion 10 is rotated, only the axial component of the movement of the screw slots is transmitted to the shaft portion 9 through the balls 10a.

In this way, the shaft portion 9 is moved right and left in accordance with the direction of rotation and the rotational angle of the motor 17 so as to change the axial position of the cylindrical gear assembly 8 through the ball bearing 11. By so doing, the depth of insertion of the cylindrical gear assembly 8 is changed with respect to the cam shaft sleeve 3 and the sprocket sleeve 5 and, by the action of the helical splines formed on the engaging surfaces thereof, the cam shaft sleeve 3 and the sprocket sleeve 5 are caused to rotate relatively. As a result, the phase of rotation of the cam shaft 1 is changed with respect to the sprocket 2a and the crankshaft 50 so as to change the valve timing of the intake valve which is driven by the cam shaft 1a.

In this case, rotation of the sprocket 2a is transmitted from the sprocket sleeve 5 to the cylindrical gear assembly 8 through the agency of the engaging portions between the internal gear helical splines 5a and the external gear helical splines 6b and 7b of the gear portions 36, 46 of the controlling member 6 and the gear portions 137, 147 of the arcuate gears 37, 47 of the cylindrical gear assembly 8, and further, rotation of the gear assembly 8 is transmitted to the cam shaft 1 through the agency of the engaging portions between the internal gear helical splines 6a and 7a and the external gear helical splines 3a of the cam shaft sleeve 3. If there is a clearance in these engaging portions, knocking will occur in that portion.

To cope with this, in the first embodiment, since the arcuate gears 37 and 47 are received in the notched spaces 6r of the controlling member 6 and biased by the coiled springs 27 so as to be constantly separated from the controlling member 6 in the axial direction, the tooth traces of the gear portions of the arcuate gears 37 and 47 tend to offset from the tooth traces of the gear portions 36 and 46 of the controlling member 6 at all times, with the result that the apparent tooth thickness of the helical splines 6a and 6b formed on the inner and outer surfaces of the gear portions 36 and 46 is increased, thereby preventing any clearance from existing between the helical splines 6a and 6b and the helical splines 3a and 5a of the cam shaft sleeve 3 and the sprocket sleeve 5, thus preventing the occurrence of knocking.

Next, description will be given of a second embodiment according to the present invention.

Figure 6:
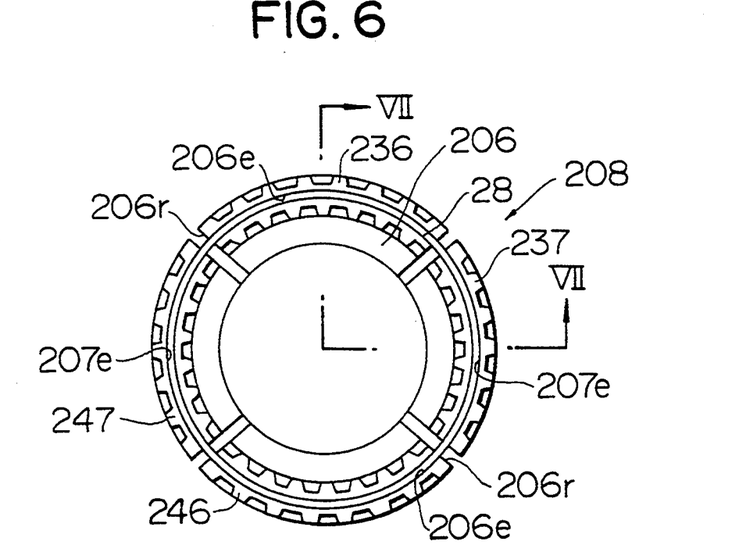
FIG. 6 is a plan view for illustrating essential portions of a second embodiment of the present invention.
Figure 7:
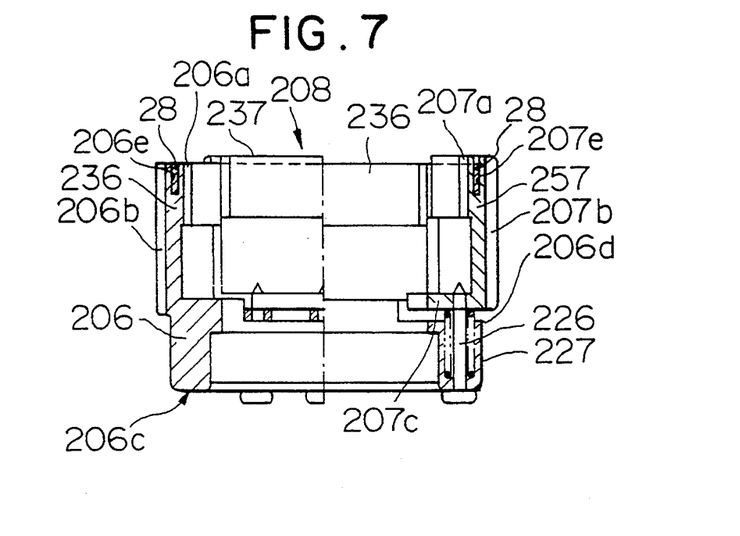
FIG. 7 is a vertical sectional view taken along the line VII—VII of FIG. 6.

FIGS. 6 and 7 illustrate the structure of the gear assembly according to the second embodiment.

The structure of the second embodiment is identical with that of the first embodiment in a point that a cylindrical gear assembly 208 comprises two gear portions 236 and 246 formed on a controlling member 206 and gear portions 257 and 267 formed on two separate arcuate gears 237 and 247 supported axially movably in notches 206r of the controlling member 206, but is different from that in a point that a common ring 28 fixed to the controlling member 206 to support radially the arcuate gears 237 and 247 is provided for connecting the gear portions 236, 246, 257 and 267 in the circumferential direction. Incidentally, the structure other than that shown in FIGS. 6 and 7 is the same as the first embodiment.

The ring 28 is pressed and fixed in circumferential grooves 206e formed in the end faces of the gear portions 236 and 246 and slidably fitted in circumferential grooves 207e formed in the end faces of the gear portions 257 and 267. For this reason, the arcuate gears 237 and 247 are prevented from inclining in the radial direction about pins 226 serving as the fulcrum, so that not only the tooth traces of helical splines 206a and 206b formed on the inner and outer surfaces of the gear portions 236 and 246 are restrained from offsetting in the radial direction with respect to the tooth traces of helical splines 207a and 207b formed on the inner and outer surfaces of the gear portions 257 and 267 but also these tooth traces are aligned on the circumference of a common circle. By so doing, any deformation is prevented from occurring in assembling the gear assembly 208 and the cam shaft sleeve 3 as well as in assembling the gear assembly 208 and the sprocket sleeve 5, thereby improving the workability. Further, it is possible to prevent the increase of the load of the motor 17 resulting from the friction, which is possible when the gear assembly 208 is moved for adjustment in the axial direction of the cam shaft 1 after the assembling.

In the both constructions of the first and second embodiments described above, the arcuate gears 37, 47, 237, 247 are received in the spaces of the notches 6r, 206r formed in the controlling members 6, 206, and the arcuate gears 37, 47, 237, 247 and the controlling members 6, 206 are biased in the axial direction, and therefore, it is possible to offset the tooth traces in a short axial length overall. Further, since the coiled springs 27, 227 are mostly inserted in the axial holes 6d, 206d formed in the end faces 6c, 206c of the controlling members 6, 206, the axial length is shortened remarkably.

Accordingly, it becomes possible to reduce the axial length overall of the valve timing control apparatus as compared with the conventional one, thereby making it possible to reduce the size of the apparatus. Further, since the coiled springs 27, 227 are received in the end portions 6c, 206c of the controlling member 6, 206, the diameter of the cylindrical gear assembly 8, 208 is not caused to increase by the springs even if the springs have a relatively large diameter.

Next, description will be given of a third embodiment according to the present invention. In this third embodiment, the controlling member is moved by the oil pressure in the axial direction of the cam shaft.

Figure 8:
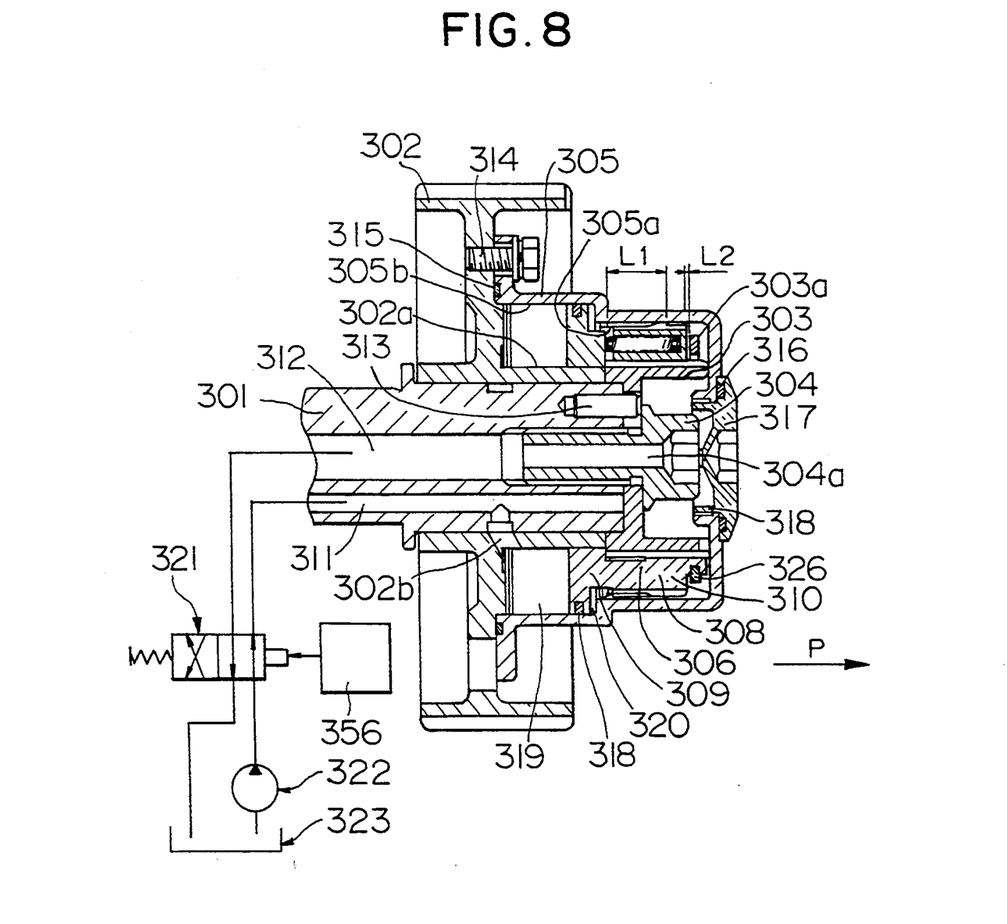
FIG. 8 is a vertical sectional view for illustrating the general construction of the whole valve timing control apparatus according to a third embodiment of the present invention.

FIG. 8 is a structural view for illustrating the sectional structure of the third embodiment according to the present invention and an oil pressure control mechanism. An intake cam shaft 301 is formed therein with two oil pressure supply passages 311 and 312. A pulley 302 is rotatably fitted on the outer periphery of the cam shaft 301. The pulley 302 is driven by the crankshaft of the engine through a cog belt which is not shown. Further, a cam sleeve 303 is fixed to the end portion of the cam shaft 301 by means of a pin 313 and a bolt 304. The cam sleeve 303 is formed on the outer periphery thereof with helical splines 303a.

A cup-shaped pulley sleeve 305 is assembled to the pulley 302 by means of a bolt 314, and an 0-ring 315 is interposed and assembled oil-tightly between the pulley sleeve 305 and the pulley 302. The pulley sleeve 305 is formed on the inner peripheral surface thereof facing to the cam sleeve 303 with helical splines 305 within a range L1 shown in FIG. 8. The pulley sleeve 305 is formed in the bottom surface thereof with a working hole 318 in which a cover 317 is screwed through an O-ring 316.

A gear assembly 308 of this embodiment is disposed in the pulley sleeve 305. The gear assembly 308 has an L-letter form cross section as a whole and is formed with a piston section 309 which extends in the radial direction and a gear section 310 which extends in the axial direction.

The piston section 309 of the gear assembly 308 is constituted by a controlling member 306 and is provided with an oil-right seal ring 318 on the outer periphery thereof. The piston section 309 is so received as to partition right and left an annular cylinder formed between a cylindrical portion 302a of the pulley 302 and a cylindrical portion 305b of the pulley sleeve 305, as shown in the drawing. A cylinder chamber 319 on the left of the position section 309 in the drawing is communicated with the oil pressure supply passage 311 through a hole 302b formed in the cylindrical portion 302a of the pulley 302. On the other hand, a cylinder chamber 320 on the right of the piston section 309 in the drawing is communicated with the oil pressure supply passage 312 through the space defined between the pulley sleeve 305, the controlling member 306 and the cam sleeve 303 and a hole 304a formed in the bolt 304.

The oil pressure supply passages 311 and 312 are connected to an oil pressure control valve 321 so that the function thereof is switched between supply of working oil from a working oil pump 322 and exhaust of working oil to a working oil tank 323. The oil pressure control valve 312 is driven by a valve timing control unit 356. By controlling supply and exhaust of working oil to and from the cylinder chambers 319, 320 by the oil pressure control valve 321, the gear assembly 308 is driven in the axial direction of the cam shaft 301.

Figure 9:
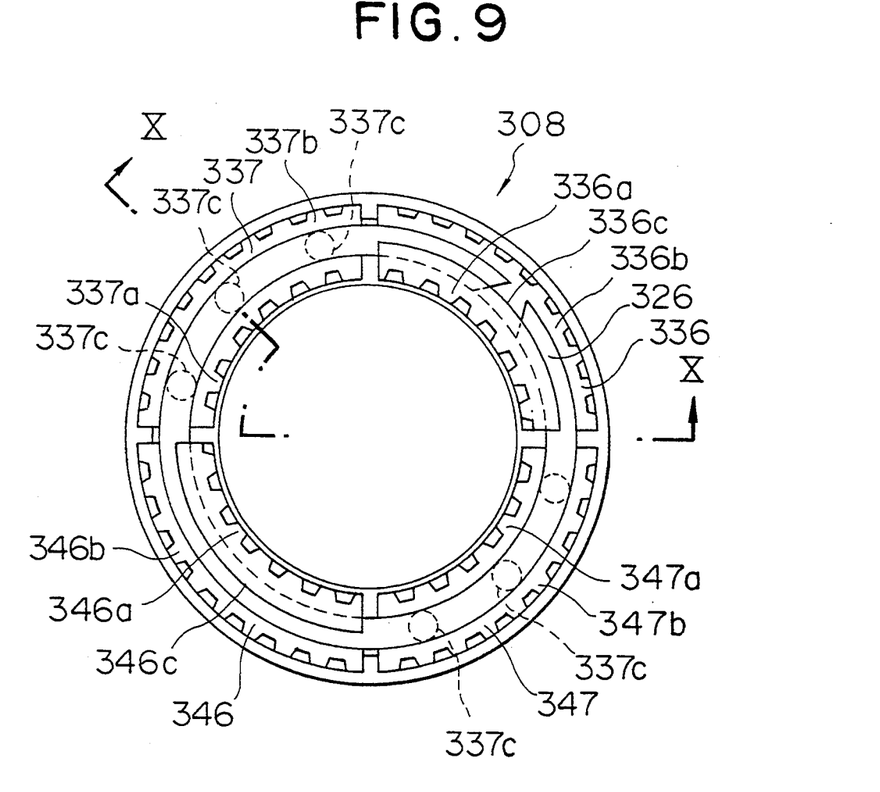
FIG. 9 is a plan view for illustrating essential portions of the embodiment shown in FIG. 8.
Figure 10:
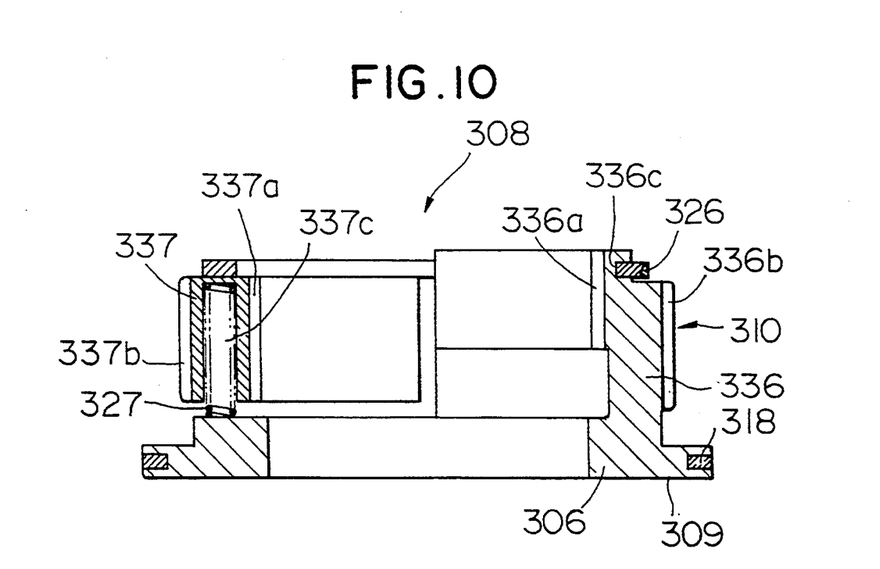
FIG. 10 is a vertical sectional view taken along the line X—X of FIG. 9.

Next, the structure of the gear assembly 308 will be described in more detail with reference to FIGS. 9 and 10. FIG. 9 is a plan view of the gear assembly 308 as viewed from the right of FIG. 8, and FIG. 10 is a sectional view taken along the line X—X of FIG. 9.

The gear section 310 of the gear assembly 308 is constituted by four arcuate portions formed by dividing a single cylinder into four quarters. The gear section 310 comprises two gear portions 336 and 346 extending from the controlling member 306 which constitutes the piston section 309 and two arcuate gears 337 and 347. The two gear portions 336 and 346 are formed on the inner peripheries thereof with helical splines 336a and 346a which are to be engaged with the helical splines 303a, and on the outer peripheries thereof with helical splines 336b and 346b to be engaged with the helical splines 305a. In appearance, the two gear portions 336 and 346 and the two arcuate gears 337 and 347 cooperate to constitute a single cylindrical gear as a whole. In this embodiment, the gear assembly 308 is formed with the helical splines for twenty-eight teeth on the inner side thereof and with the helical splines for forty teeth on the outer side thereof.

The two arcuate gears 337 and 347 are made of a resin material the slidability of which is excellent. The two arcuate gears 337 and 347 are formed with three holes 337c and 347c, respectively, and springs 327 are received under compression in the holes 337c and 347c. Grooves 336c and 346c are formed in the end portions of the two gear portions 336 and 346, respectively, so as to be opened in the radial direction as shown in FIG. 10, and a snap ring 326 is fitted in these grooves 336c and 346c. For this reason, the two arcuate gears 337 and 347 are brought into contact with the snap ring 326 at the ends thereof so that they are restrained from moving in the axial direction and assembled in a state shown in FIG. 9. In this state, the tooth traces of the helical splines formed on the inner and outer peripheries of the two gear portions 336 and 346 and the tooth traces of the helical splines formed on the inner and outer peripheries of the two arcuate gears 337 and 347 are offset from each other.

In this embodiment, after the gear assembly 308 assembled in the state of FIG. 9 is fitted on the pulley 302, the cam sleeve 303 is assembled while making the helical splines engage with each other. Then, the pulley sleeve 305 is assembled while making the helical splines engage with each other. In this assembling process, the springs 327 are compressed from the state of FIG. 9 so that the offset of the tooth trace existing in the state of FIG. 9 is reduced. In the state of FIG. 8 in which the assembling is finished, there is a gap L2 between the snap ring 326 and the two arcuate gears 337 and 347.

Figure 11A:
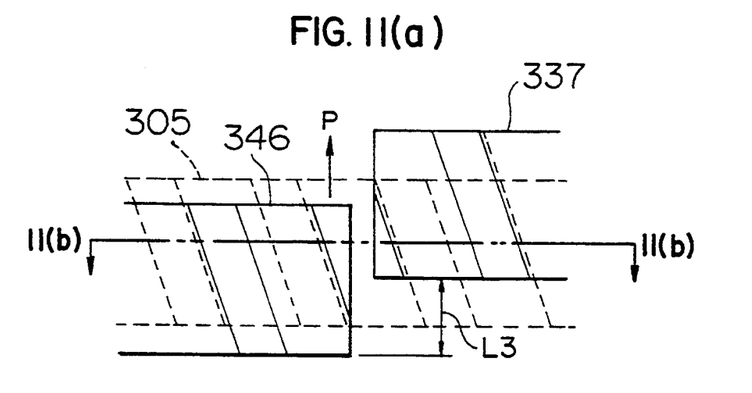
FIGS. 11(a) 11(b) and 11(c) are a combination of schematic views for illustrating schematically the state of engagement of helical splines.
Figure 11B:
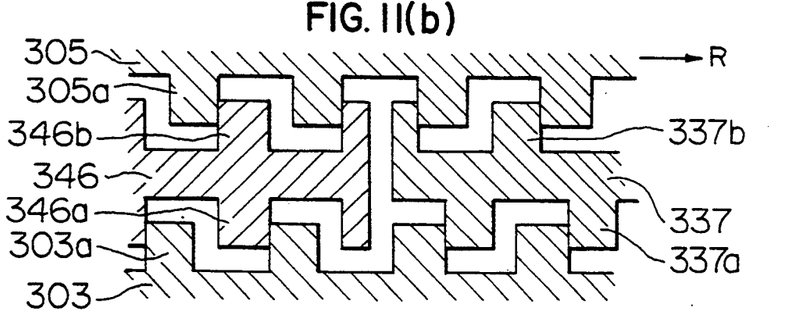
Figure 11C:
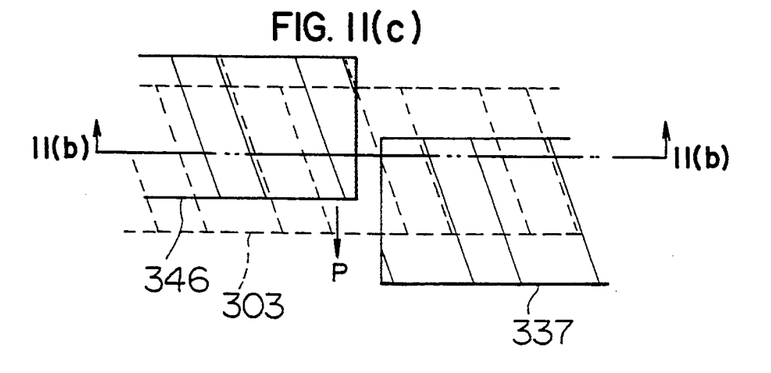

FIGS. 11(a), 11(b) and 11(c) are a combination of explanatory views for schematically illustrating the state of engagement between the respective helical splines. FIG. 11(a) is a plan view in which the gear portion 346 and the arcuate gear 337 are shown by the solid line and the pulley sleeve 305 is shown by the broken line. FIG. 11(b) is a sectional view for illustrating schematically the state of engagement between the gear portion 346, the arcuate gear 337, the cam sleeve 303 and the pulley sleeve 305. Further, FIG. 11(c) is a plan view in which the gear portion 346 and the arcuate gear 337 are shown by the solid line and the cam sleeve 303 is shown by the broken line. Incidentally, FIG. 11(b) is a sectional view of FIG. 11(a) and 11(c) as viewed from an arrow mark direction along the lines 11(b). In FIGS. 11(a), 11(b) and 11(c), in order to simplify the explanation, the internal and external gears are shown as having the same number of teeth.

After the assembling, as shown in FIG. 11, the helical splines 337a and 347a of the two arcuate gears 337 and 347 are biased against the tooth surfaces on one side of the helical splines 303a of the cam sleeve 303 and the helical splines 336a and 346a of the two gear portions 336 and 346 are biased against the tooth surfaces on the other side of the helical splines 303a of the cam sleeve 303 by the action of the springs 327. On the other hand, the helical splines 337b and 347b of the two arcuate gears 337 and 347 are biased against the tooth surfaces on one side of the helical splines 305a of the pulley sleeve 305 and the helical splines 336b and 346b of the two gear portions 336 and 346 are biased against the tooth surfaces on the other side of the helical splines 305a of the pulley sleeve 305 by the action of the springs 327.

For this reason, rotation of the pulley sleeve 305 in the direction of an arrow mark R is transmitted to the two tear portions 336 and 346 due to contact of the helical splines 305a with the helical splines 336b and 346b, and further transmitted to the cam sleeve 303 due to contact of the helical splines 336a and 346a with the helical splines 303a. At this time, a thrust in the direction of an arrow mark P is generated on the two gear portions 336 and 346 in accordance with the direction of torsion of the helical splines.

On the other hand, the two arcuate gears 337 and 347 are shifted by the springs 327 in the direction of an arrow mark P by a distance L3, as shown in FIG. 11, and are brought into contact with the helical splines 305a and 303a. For this reason, rotation of the pulley sleeve 305 in the direction of the arrow mark R is not transmitted to the two arcuate gears 337 and 347, but rotation of the pulley 302 is transmitted to the cam shaft 301 through the two gear portions 336 and 346 exclusively.

According to such embodiment, since the biasing forces exerted by the springs 327 are directed equally in the direction of the arrow mark P, it is not necessary for the springs to bias the two arcuate gears 337 and 347 against the thrust produced due to torsion of the helical splines. For this reason, it is possible to reduce the biasing force of the spring. In other words, a driving force in the direction R transmitted through the gear assembly does not pass the arcuate gears 337 and 347 and passes only the gear portions 236 and 246.

Further, since the tooth surface pressure applied to the tooth surfaces of the splines of the two arcuate gears 337 and 347 is reduced as well, the two arcuate gears 337 and 347 can be made of a resin material that allows the tooth surfaces to slide smoothly, thereby making it possible to move the gear assembly 308 smoothly in the axial direction.

Next, operation of this third embodiment will be described.

When the control valve 321 is in the state shown in FIG. 8 according to the instruction from the control unit 356, the working oil from the pump 322 is induced to the cylinder chamber 319 through the passage 311 and the hole 302b. On the other hand, the working oil in the cylinder chamber 320 is returned to the tank 323 through the hole 304a and the passage 312. For this reason, the gear assembly 308 is moved to the right in FIG. 8, so that the valve timing is changed.

Further, as the control valve 321 is changed over from the state of FIG. 8 in response to the instruction from the control unit 356, the working oil from the pump 322 is induced to the cylinder chamber 320 through the passage 312 and the hole 304a. On the other hand, the working oil in the cylinder chamber 319 is returned to the tank 323 through the hole 302b and the passage 311. For this reason, the gear assembly 308 is moved to the left in FIG. 8, so that the valve timing is changed.

During such operation as well, the two arcuate gears 37 and 347 are biased in the direction of the arrow mark P by means of the springs 327, so that backlash of engagement between the splines is reduced, resulting in that production of gear knocking caused due to change of the rotational frequency of the engine is reduced.

According to the third embodiment described above, since the springs 327 are received in the arcuate gears 337 and 347, it is possible to reduce the overall size. In particular, the axial length overall can be shortened, thereby making it possible to reduce the projection amount when attached to the end portion of the cam shaft of the engine.

Further, by using the snap ring 326, temporary assembling is made possible as shown in FIG. 7, so that the construction can be simplified as compared with the case in which the pin is used like the first embodiment.

Moveover, in the above-described embodiment, in setting the two arcuate gears 337 and 347, they are arranged on the circumference of the gear assembly 308 at intervals of 180°. For this reason, the springs 327 can be arranged suitably on the circumference of the gear assembly 308, so that interference between the engaged splines can be reduced.

Incidentally, in case that a number, n, of independent arcuate gears are disposed in place of the arrangement of the above-described embodiment, it is preferred that the independent arcuate gears are arranged at intervals of 360°/n, e.g., it is preferred that three independent arcuate gears are arranged at intervals of 120°.

Further, in the above-described embodiment, the two arcuate gears 337 and 347 have been described as each being formed to extend over the range of about 90°, and however, the arcuate gears 337 and 347 may be formed to extend over the range of about 30° and the gear portions 336 and 346 may be formed to extend over the range of about 150°.

In addition, in this embodiment, a total number of teeth of the internal gear and a total number of teeth of the external gear of the gear assembly 308 are such integers that can be divided by a common divisor n (n being not smaller than 2). For this reason, the same positional relationship between the internal and external gears appears on the gear assembly 308 every 360°/n. In consequence, in case of arranging the number, n, of independent arcuate gears at intervals of 360°/n, it is possible to form the helical splines on each arcuate gear in the same configuration.

In this embodiment, the gear assembly 308 is formed with the helical splines for twenty-eight teeth on the inner side thereof and with the helical splines for forty teeth on the outer side thereof, and a number, n (=2), is the common divisor of the internal and external gears. For this reason, it is possible to make the two arcuate gears 337 and 347 to be arranged at intervals of 180° have the same tooth configuration. In consequence, the process of forming the helical splines and the process of assembling the two arcuate gears 337 and 347 are facilitated.

Incidentally, in this embodiment, even in case of arranging the four arcuate gears at intervals of 90°, it is possible to make the four independent arcuate gears have the same configuration.

Further, when a number, 2n, is one of the common divisors, all arcuate gears formed by equally dividing a single cylindrical gear into a number, n, sections are in the circular shape corresponding to the gear portions 336 and 346, so that the arcuate gears can be manufactured more easily.

Moreover, it is also possible to manufacture the two gear portions 336 and 346 and the two arcuate gears 337 and 347 by dividing a single cylindrical gear which is formed with helical splines on the inner and outer peripheries thereof.

Incidentally, the control valve 321 is not limited to the two-position change-over valve shown in FIG. 8 but may be a three-position change-over valve which has a cut-off position at which the both passages are cut off.

Next, a fourth embodiment according to the present invention will be described.

Figure 12:
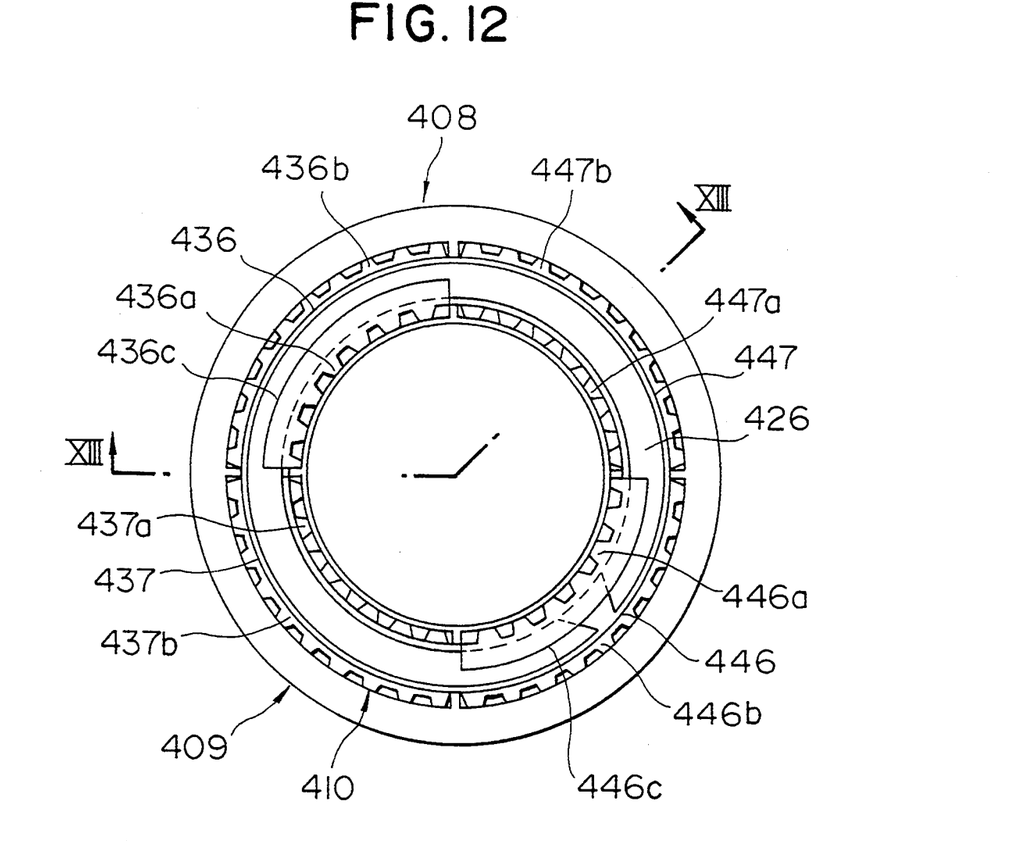
FIG. 12 is a plan view for illustrating essential portions of a fourth embodiment of the present invention.

In this fourth embodiment, the direction of torsion of the helical splines formed on the various portions of the third embodiment is reversed and, further, the biasing direction of the springs are reversed. The structure of the gear assembly of the fourth embodiment will be described below with reference to FIGS. 12 and 13. Incidentally, other structures are the same as the third embodiment except the direction of torsion of the helical splines. FIG. 12 is a plan view of a gear assembly 408 as viewed from the right of FIG. 8, and FIG. 13 is a sectional view taken along the line XIII—XIII of FIG. 12.

The gear assembly 408 has an L-letter form cross section as a whole and is formed with a piston section 409 which extends in the radial direction and a gear section 410 which extends in the axial direction. The piston section 409 of the gear assembly 408 is constituted by a controlling member 406 and is provided with an oil-tight seal ring 418 on the outer periphery thereof. The gear section 410 of the gear assembly 408 is constituted by four arcuate portions formed by dividing a single cylinder into four quarters. The gear section 410 comprises two gear portions 436 and 446 extending from the controlling member 406 which constitutes the piston section 409 and two arcuate gears 437 and 447. The two gear portions 436 and 446 are formed on the inner peripheries thereof with helical splines 436a and 446a which are to be engaged with helical splines 403a, and on the outer peripheries thereof with helical splines 436a, and on the outer peripheries thereof with helical splines 436b and 446b to be engaged with helical splines 405a. In appearance, the two gear portions 436 and 446 and the two arcuate gears 437 and 447 cooperate to constitute a single cylindrical gear as a whole.

The two arcuate gears 437 and 447 are made of a resin material the slidability of which is excellent. The two arcuate gears 437 and 447 are each formed with three holes like the third embodiment, and springs are received under compression in these holes. FIG. 13 illustrates one of holes 447c and a spring 427 received therein.

Figure 13:
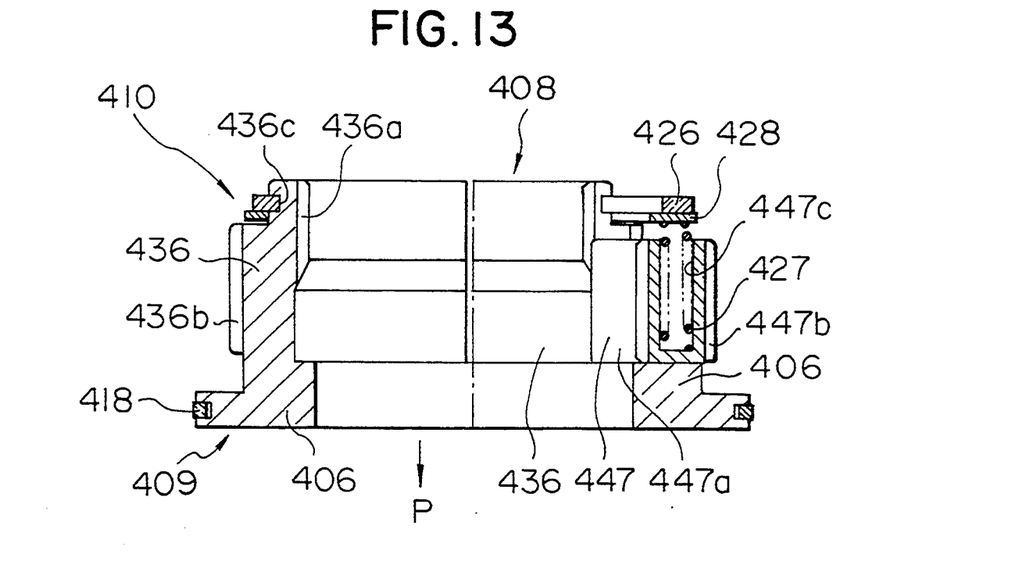
FIG. 13 is a vertical sectional view taken along the line XIII—XIII of FIG. 12.
Figure 14A:
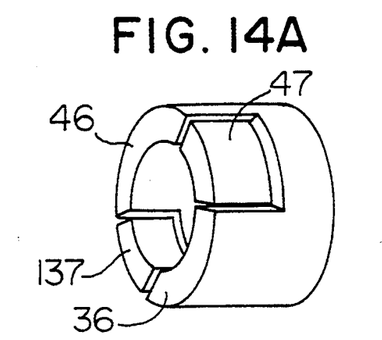
FIGS. 14A–FIG. 14E are schematic oblique projection views respectively showing various dividing manners of controlling members.
Figure 14B:
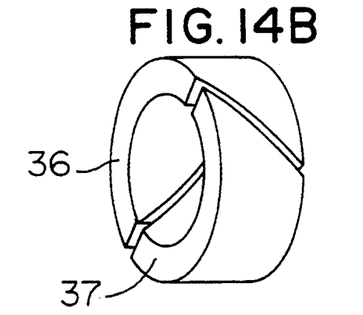
Figure 14C:
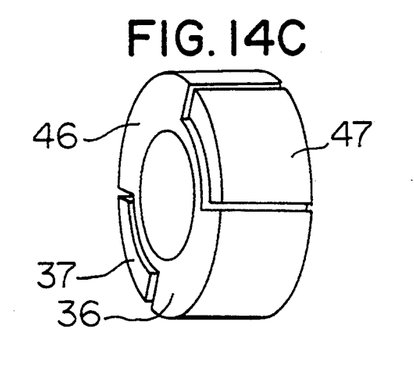
Figure 14D:
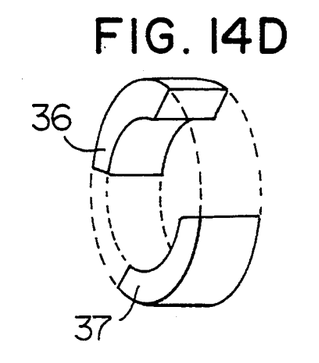
Figure 14E:
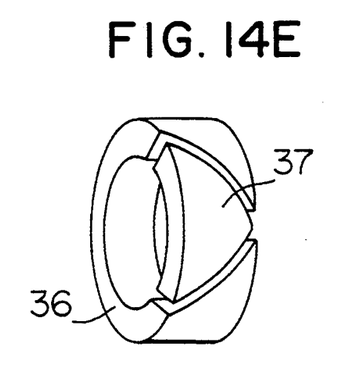

Grooves 436c and 446c are formed in the end portions of the two gear portions 436 and 446, respectively, so as to be opened in the radial direction as shown in FIG. 13, and a snap ring 426 is fitted in these grooves. Further, a washer 428 is interposed between the snap ring 426 and the springs 427. For this reason, when one ends of the springs 427 are fixed by the snap ring 426 and the two arcuate gears 437 and 447 are brought into contact with the controlling member 406, assembling is advanced to a state shown in FIG. 13. In this state, the tooth traces of the helical splines formed on the inner and outer peripheries of the two gear portions 436 and 446 and the tooth traces of the helical splines formed on the inner and outer peripheries of the two arcuate gears 437 and 447 are offset from each other.

In this embodiment, since the direction of torsion of the helical splines of the third embodiment is reversed, as the pulley is rotated, a thrust in the direction of an arrow mark P is generated on the controlling member 406. On the other hand, since the two arcuate gears 437 and 447 are biased in the direction of the arrow mark P by the springs 427, the same effect as that of the above-described third embodiment can be obtained.

In the valve timing control apparatus according to the present invention, since the cylindrical gear assembly which is to be inserted in the axial direction between the central and outer peripheral gears is constituted by the controlling member and the arcuate gears which are separated in the circumferential direction, it is possible to reduce the gear knocking caused between the gear assembly and the gears disposed inside and outside thereof.

For this reason, it becomes possible to reduce the overall size of the valve timing control apparatus, with the result that it is possible to obtain a valve timing control apparatus which can be mounted on the internal combustion engine satisfactorily.

The controlling member 6 may be divided by various manners different from the beforementioned manner into the arcuate gears 36 and 46 and the arcuate gears 37 and 47 by faces thereof extending respectively in substantially axial directions, as shown in FIGS. 14A–14E.

What is claimed is:

1. A non-backlash toothed wheel mechanism comprising:
    an internal gear,
    an external gear mating with the internal gear,
    wherein at least one of the internal gear and the external gear has a circumferentially arranged gear teeth array and at least two gear parts each of which has gear teeth forming a part of the circumferentially arranged gear teeth array, the gear parts face each other in the circumferential direction, and a positional relation between the gear parts is changeable, and
    elastic means for urging one of the two gear parts relatively to another one of the two gear parts to change the positional relation between the gear parts so that each of the gear parts mates with another one of the internal gear and the external gear to reduce backlash between the internal gear and the external gear.

2. A non-backlash toothed wheel mechanism according to claim 1, wherein each of the internal gear and the external gear mating with each other is a helical gear, and the positional relation between the gear parts is changed in the substantially axial direction of the mechanism.

3. A non-backlash toothed wheel mechanism according to claim 1, wherein the one of the two gear parts is moveably supported on the another one of the two gear parts, and a driving torque through the mechanism passes between the internal and external gears through the another one of the two gear parts without passing through the one of the two gear parts.

4. A non-backlash toothed wheel mechanism according to claim 3, wherein the one of the two gear parts is made of a plastic.

5. A non-backlash toothed wheel mechanism according to claim 1, wherein the one of the two gear parts is moveably supported on the another one of the two gear parts through at least two contact portions therebetween, and the two contact portions are arranged apart from each other in a substantially axial direction of the mechanism.

6. A non-backlash toothed wheel mechanism according to claim 1, wherein the gear parts are arranged substantially symmetrically in relation to an axis of the mechanism.

7. A non-backlash toothed wheel mechanism according to claim 1, wherein the gear parts are arranged substantially symmetrically in relation to an imaginary plane passing an axis of the mechanism.

8. A non-backlash toothed wheel mechanism according to claim 1, wherein a number of teeth of each of the internal gear and the external gear is twice as many as a natural number.

9. A non-backlash toothed wheel mechanism according to claim 1 wherein the one of the internal gear and the external gear is divided into the gear parts by a face thereof extending in a substantially axial direction of the mechanism.

10. A non-backlash toothed wheel mechanism according to claim 1 wherein a position of each of the gear parts is substantially constant in a radial direction of the mechanism.

11. A rotational phase adjuster, comprising:
    a first gear wheel having an internal first gear,
    a second gear wheel having an external first gear and an internal second gear, the external first gear mating with the internal first gear,
    a third gear wheel having an external second gear mating with the internal second gear, and
    actuator means for moving the second gear wheel in a substantially axial direction of the adjuster to generate a rotational phase difference between the first gear wheel and the third gear wheel, wherein a least one of a mating gear pair of the external first gear and the internal first gear and a mating gear pair of the external second gear and the internal second gear is a helical gear pair, at least one of the internal first gear, the internal second gear, the external first gear and the external second gear has a circumferentially arranged gear teeth array and at least two gear parts each of which has gear teeth forming a part of the circumferentially arranged gear teeth array, the gear parts face each other in the circumferential direction, and a positional relation between the gear parts is changeable, and
    elastic means for urging one of the two gear parts relatively to another one of the two gear parts to change the positional relation between the gear parts so that each of the gear parts mates with another one of the internal first gear, the internal second gear, the external first gear and the external second gear to reduce backlash between the internal first gear, the internal second gear, the external first gear and the external second gear.

12. A rotational phase adjuster according to claim 11, wherein each of the gear parts and the another one of the internal first gear, the internal second gear, the external first gear and the external second gear mating with each other are helical gears, and the positional relation between the gear parts is changed in a substantially axial direction of the adjuster.

13. A rotational phase adjuster according to claim 11, wherein the one of the two gear parts is moveably supported on the another one of the two gear parts, and a driving torque passes between the first gear wheel and the third gear wheel through the another one of the two gear parts without passing through the one of the two gear parts.

14. A rotational phase adjuster according to claim 11, wherein the one of the two gear parts is moveably supported on the another one of the two gear parts through at least two contact portions therebetween, and the two contact portions are arranged apart from each other in the substantially axial direction of the adjuster.

15. A rotational phase adjuster according to claim 11 wherein the one of the internal first gear, the internal second gear, the external first gear and the external second gear is divided into the gear parts by a face thereof extending in a substantially axial direction of the adjuster.

16. A rotational phase adjuster according to claim 11 wherein a position of each of the gear parts is substantially constant in a radial direction of the adjuster.

* * * * *